US012726077B2

(12) United States Patent
Chung et al.

(10) Patent No.: US 12,726,077 B2
(45) Date of Patent: Sep. 1, 2026

(54) SPEED-REDUCER-AND-MOTOR ALL-IN-ONE MACHINE

(71) Applicant: Delta Electronics, Inc., Taoyuan City (TW)

(72) Inventors: Chi-Wen Chung, Taoyuan City (TW); Hung-Wei Lin, Taoyuan City (TW); Fu-Kuang Yang, Taoyuan City (TW); Shu-Hsiang Yang, Taoyuan City (TW); Tzu-Min Yi, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 275 days.

(21) Appl. No.: 18/136,752

(22) Filed: Apr. 19, 2023

(65) Prior Publication Data

US 2023/0412045 A1 Dec. 21, 2023

Related U.S. Application Data

(60) Provisional application No. 63/353,500, filed on Jun. 17, 2022.

(30) Foreign Application Priority Data

Jan. 31, 2023 (CN) ......................... 202310047182.7

(51) Int. Cl.
*H02K 7/102* (2006.01)

(52) U.S. Cl.
CPC .................................... *H02K 7/102* (2013.01)

(58) Field of Classification Search
CPC ............ H02K 7/00; H02K 7/003; H02K 7/08; H02K 7/083; H02K 7/10; H02K 7/14; H02K 7/102; H02K 7/116; H02K 5/00; H02K 5/16; H02K 5/17; H02K 5/173; H02K 5/1732; H02K 11/30; H02K 11/32; H02K 41/06; F16H 49/00; F16H 49/001; F16H 1/00; F16H 1/32; F16H 57/00; F16H 57/04; F16H 57/042; F16H 57/0427;

(Continued)

(56) References Cited

U.S. PATENT DOCUMENTS

2013/0004348 A1* 1/2013 Sugiyama ........... F04D 29/0513
384/114

FOREIGN PATENT DOCUMENTS

CN 106100205 A * 11/2016 ............... H02K 9/19
CN 109551467 A 4/2019
CN 109478826 B 4/2021

(Continued)

*Primary Examiner* — Jose A Gonzalez Quinones
(74) *Attorney, Agent, or Firm* — KIRTON McCONKIE; Evan R. Witt

(57) ABSTRACT

A speed-reducer-and-motor all-on-one machine is disclosed and includes a connection shaft, a motor and a speed reducer. The connection shaft includes a first section, a second section and an accommodation space. The first section and the second section are arranged in an axial direction. The accommodation space is in communication between a front end and a rear end of the connection shaft. An elliptical cam is formed on an outer surface of the second section of the connection shaft. An outer diameter of the first section is greater than a major axis length of the elliptical cam. The motor is received within the accommodation space and connected to an inner surface of the first section. The speed reducer is connected to the outer surface of the second section.

20 Claims, 5 Drawing Sheets

(58) Field of Classification Search
CPC .... F16D 3/00; F16D 3/18; F16C 19/00; F16C 19/06
USPC ........................................................... 310/77
See application file for complete search history.

(56) References Cited

FOREIGN PATENT DOCUMENTS

| | | | | | |
|---|---|---|---|---|---|
| CN | 114313054 A | * | 4/2022 | | |
| JP | H10164797 A | | 6/1998 | | |
| JP | 2004190787 A | * | 7/2004 | | |
| JP | 2007028700 A | | 2/2007 | | |
| JP | 2009248579 A | | 10/2009 | | |
| JP | 2016029877 A | * | 3/2016 | | |
| JP | 2018035885 A | | 3/2018 | | |
| JP | 2018179252 A | | 11/2018 | | |
| TW | M512259 U | | 11/2015 | | |
| TW | 201806293 A | | 2/2018 | | |
| TW | I636206 B | | 9/2018 | | |
| TW | 202104772 A | | 2/2021 | | |
| WO | WO-2016024340 A1 | * | 2/2016 | ............. | H02K 7/102 |
| WO | WO-2018043398 A1 | * | 3/2018 | ............. | H02K 7/116 |

* cited by examiner

SPEED-REDUCER-AND-MOTOR ALL-IN-ONE MACHINE

CROSS-REFERENCE TO RELATED APPLICATION

This application claims the benefit of U.S. Provisional Application No. 63/353,500 filed on Jun. 17, 2022, and entitled "SPEED-REDUCER-AND-MOTOR ALL-IN-ONE MACHINE". This application also claims priority to China Patent Application No. 202310047182.7, filed on Jan. 31, 2023. The entireties of the above-mentioned patent application are incorporated herein by reference for all purposes.

FIELD OF THE INVENTION

The present disclosure relates to a power-driving device, and more particularly to a speed-reducer-and-motor all-on-one machine capable of simplifying the assembling structure of the speed reducer and the motor to achieve the purposes of thinning the structure and maintaining the characteristics of high reduction ratio at the same time.

BACKGROUND OF THE INVENTION

A motorized speed reducer or a geared motor is an integrated power-driving device, which combines a motor and a reducer. Since the motorized speed reducer allows the motor to be converted into a low speed with high torque through the reducer when the motor is operating at a high speed with low torque, so that it is capable of providing a high torque output with a relatively small volume. Therefore, combining a motor and a reducer as a power-driving device is a common way in the industry.

In the configuration of the conventional geared motor, the gears are usually arranged on the motor shaft to engage and drive the reducer, or the reducer is coaxially arranged on one side of the motor shaft. However, when the motor and the reducer need to be coaxially arranged, the entire volume of the combination of the two parts in the axial direction is huge. Especially, the axial length of the motor shaft combined with the reducer takes up too much space. Therefore, in the arrangement structure of the reducer and the motor, how to effectively improve the space utilization rate, maintain a high reduction ratio and reduce the structural components and the space volume simultaneously has always been an important issue in the field.

In view of this, there is a need of providing a speed-reducer-and-motor all-on-one machine. By integrating the configuration of the motor and the reducer, the problem that the conventional coaxial motor and reducer is difficult to reduce the entire volume and achieve thinning is improved, and the performance of high reduction ratio is maintained at the same, so as to obviate the drawbacks encountered by the prior arts.

SUMMARY OF THE INVENTION

An object of the present disclosure is to provide a speed-reducer-and-motor all-on-one machine. By integrating the configuration of the motor and the reducer, the problem that the conventional coaxial motor and reducer is difficult to reduce the entire volume and achieve thinning is improved, and the performance of high reduction ratio is maintained at the same.

Another object of the present disclosure is to provide a speed-reducer-and-motor all-on-one machine. The speed reducer and the motor are combined through an integrated connection shaft. The connection shaft includes a first section and a second section arranged along an axial direction with different diameters to form different accommodation spaces. The outer-rotor motor and the speed reducer are cooperated with the connection shaft and sleeved concentrically in the radial direction to form parallel shafts, and the connection shaft is disposed between the outer rotor motor and the input shaft of the speed reducer. It is helpful for space optimization. In addition, the integrally formed connection shaft provides the same function as the output shaft of the outer-rotor motor and the input shaft of the speed reducer. Preferably, the first section with the larger diameter forms is configured to form the output shaft of the outer-rotor motor, and the second section with the smaller diameter is configured to form the input shaft of the speed reducer. It helps to simplify the connection of the output shaft of the outer-rotor motor to the input shaft of the speed reducer. There are two bearings concentrically sleeved through the second section of the connection shaft in the radial direction, and it is more conducive to shortening the axial length and achieving the thinning requirement. Furthermore, the first section that provides the function of the output shaft of the outer-rotor motor is a perfect circle, and it allows designing the outer diameter of the first section in accordance with the accommodation space required by the motor and the pitch circle diameter (PCD) of gear meshing in the speed reducer. The second section that provides the function of the input shaft of the speed reducer is an elliptical cam. Under the condition that the length of the minor axis of the elliptical cam is not tangent to the inner diameter of the second section and not greater than the outer diameter of the first section, the pitch circle diameter of the gear meshing in the speed reducer is further related to form a design parameter relative to the difference of the major axis length and the minor axis length of the elliptical cam. Within a specific range, it allows the motor and the speed reducer combined through the integrated connection shaft of the present disclosure to maintain the performance of high reduction ratio.

A further object of the present disclosure is to provide a speed-reducer-and-motor all-on-one machine. Since independent spaces are provided in the interior and the exterior of the integrated connection shaft, the space formed between the reducer and the outer peripheral wall of the connection shaft can be served as an oil storage space, and the interior of the connection shaft can be served as an independent accommodation space for receiving the motor and the encoder. The independent accommodation space is not contaminated due to the lubricating oil of the reducer. On the other hand, it allows to connect the peed-reducer-and-motor all-on-one machine to a ball spline in the axial direction directly, so as to provide the applications with the high reduction ratio and obtain a higher transmission torque with better cost advantages. Preferably, the spline shaft of the ball spline passes through the central shaft of the motor, and the spline nut is fixed and connected to the speed-reducer output shaft directly, so as to form an integrated structure. It facilitates to make the overall structure more simplified and compact. Moreover, the utilization rate of space volume is improved effectively, the purpose of high reduction ratio is achieved, and the higher transmission torque is obtained at the same time.

In accordance with an aspect of the present disclosure, a speed-reducer-and-motor all-on-one machine is provided and includes a connection shaft, a motor and a speed reducer. The connection shaft includes a first section, a second section and an accommodation space. The first section and the second section are arranged in an axial direction. The accommodation space is in communication between a front end and a rear end of the connection shaft. An elliptical cam is formed on an outer surface of the second section of the connection shaft. An outer diameter of the first section is greater than a major axis length of the elliptical cam. The motor is received within the accommodation space and connected to an inner surface of the first section. The speed reducer is connected to the outer surface of the second section.

In an embodiment, the motor includes a stator, a rotating element and a central shaft. The central shaft passes through the stator and is arranged along the axial direction. The rotating element is spatially corresponding to the stator. The inner surface of the first section of the connection shaft is concentrically sleeved on the rotating element of the motor, so as to collaboratively form a rotor of the motor. The central shaft and the stator are received in the accommodation space.

In an embodiment, the speed reducer is concentrically sleeved on the connection shaft and includes a speed-reducer output shaft, which is connected to the outer surface of the second section of the connection shaft through a first bearing.

In an embodiment, an inner surface of the second section of the connection shaft is concentrically sleeved on the central shaft of the motor through a second bearing in the radial direction.

In an embodiment, the speed-reducer output shaft, the first bearing, the second section of the connection shaft, the second bearing and the central shaft of the motor are arranged radially from the outside to the inside.

In an embodiment, the speed-reducer-and-motor all-on-one machine further includes an end cover disposed adjacent to the front end of the connection shaft and fixed to an end of the central shaft of the motor.

In an embodiment, the motor further includes an encoder, which is spatially corresponding to the front end of the connection shaft, configured to measure a rotational speed and an angle information of the connection shaft, wherein the encoder is fixed on the end cover or the front end of the connection shaft.

In an embodiment, the front end of the connection shaft is connected to the end cover through a third bearing.

In an embodiment, the outer diameter of the first section is gradually increased to a constant value along a direction away from the second section.

In an embodiment, the fixed end of the speed reducer, the first section of the connection shaft, and the rotating element, the stator and the central shaft of the motor are arranged radially from the outside to the inside.

In an embodiment, the central shaft of the motor is extended outwardly through the front end of the connection shaft, and the motor includes a circuit board fixed on an outer periphery of the central shaft, received in the accommodation space and disposed adjacent to the front end of the connection shaft.

In an embodiment, the circuit board is externally connected through a motor outlet, and the motor outlet is externally connected through a hollow portion of the central shaft.

In an embodiment, the elliptical cam has the major axis length and a minor axis length, wherein the minor axis length is greater than an inner diameter of the second section, and the minor axis length is not greater than an outer diameter of the first section.

In an embodiment, gear meshing in the speed reducer has a pitch circle diameter, which is not smaller than the outer diameter of the first section.

In an embodiment, a design parameter is defined by the pitch circle diameter relative to the difference between the major axis length and the minor axis length, and the design parameter is ranged from 18 to 92.

In an embodiment, the first section and the second section of the connection shaft are integrally formed into one piece.

In an embodiment, the connection shaft is configured to form a motor output shaft, and connected to the rotating element of the motor through the inner surface of the first section of the connection shaft. When the motor is rotated, the speed reducer is driven through the connection shaft.

In an embodiment, the connection shaft is configured to form a reducer input shaft and connected to a speed-reducer output shaft through the outer surface of the second section of the connection shaft and the first bearing. When the motor is rotated, the speed reducer is driven through the connection shaft.

In an embodiment, the speed-reducer-and-motor all-on-one machine further includes a ball spline connected to the speed-reducer output shaft, wherein the ball spline includes a spline nut, a spline shaft and a plurality of balls, the spline shaft passes through the central shaft of the motor in the axial direction, and the spline nut is concentrically sleeved on the spline shaft in a radial direction, fixed on the speed-reducer output shaft, and connected with the spline shaft through the plurality of balls.

In one embodiment, an oil storage space is formed between the reducer and an outer peripheral wall of the connection shaft.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
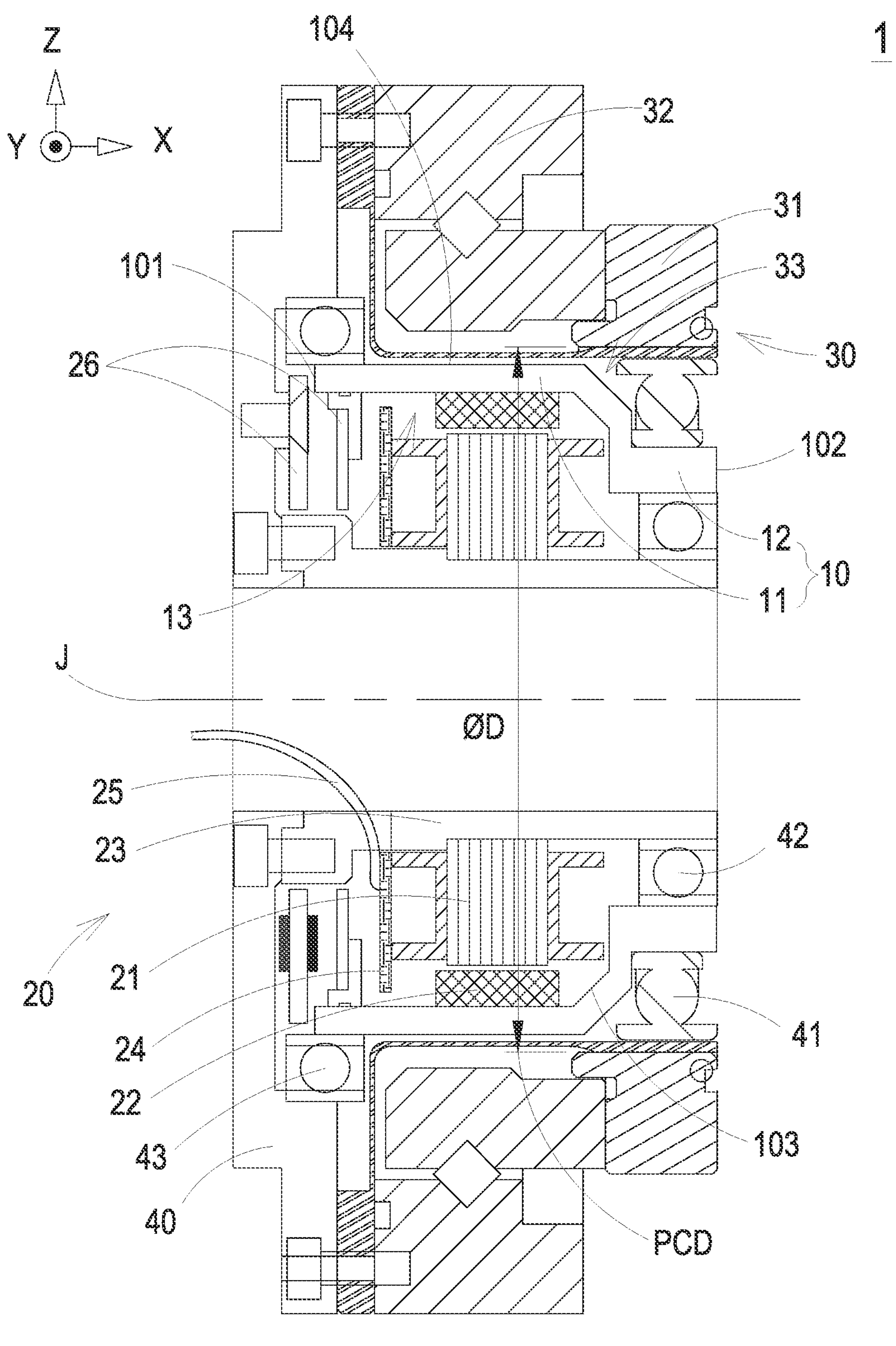
FIG. 1 is a cross-sectional view illustrating a speed-reducer-and-motor all-in-one machine according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "inner," "outer," "front," "rear" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2:
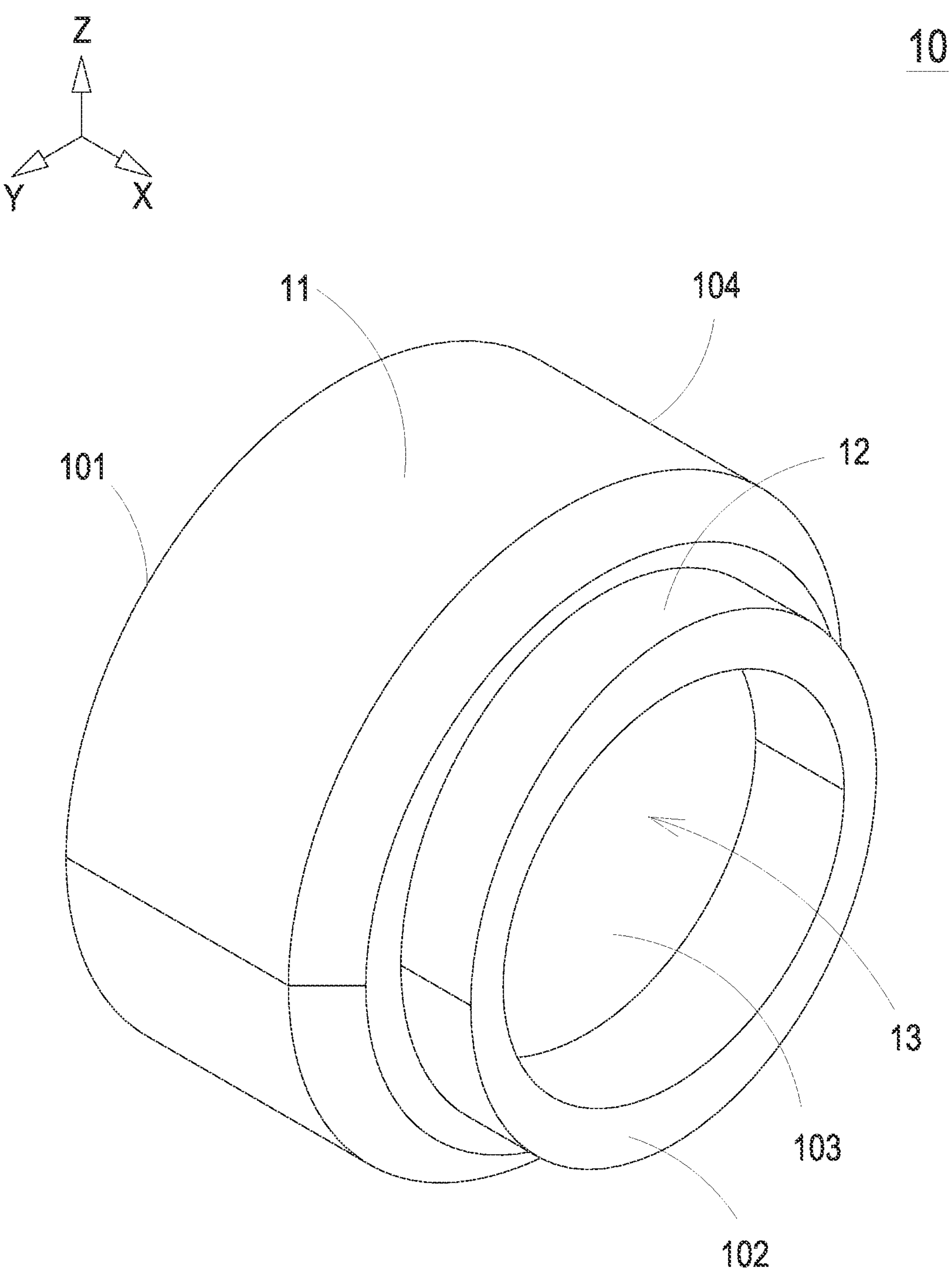
FIG. 2 is a perspective structural view illustrating the connection shaft of the speed-reducer-and-motor all-in-one machine according to the first embodiment of the present disclosure.
Figure 3:
FIG. 3 is a rear view illustrating the connection shaft of the speed-reducer-and-motor all-in-one machine according to the first embodiment of the present disclosure.
Figure 3:
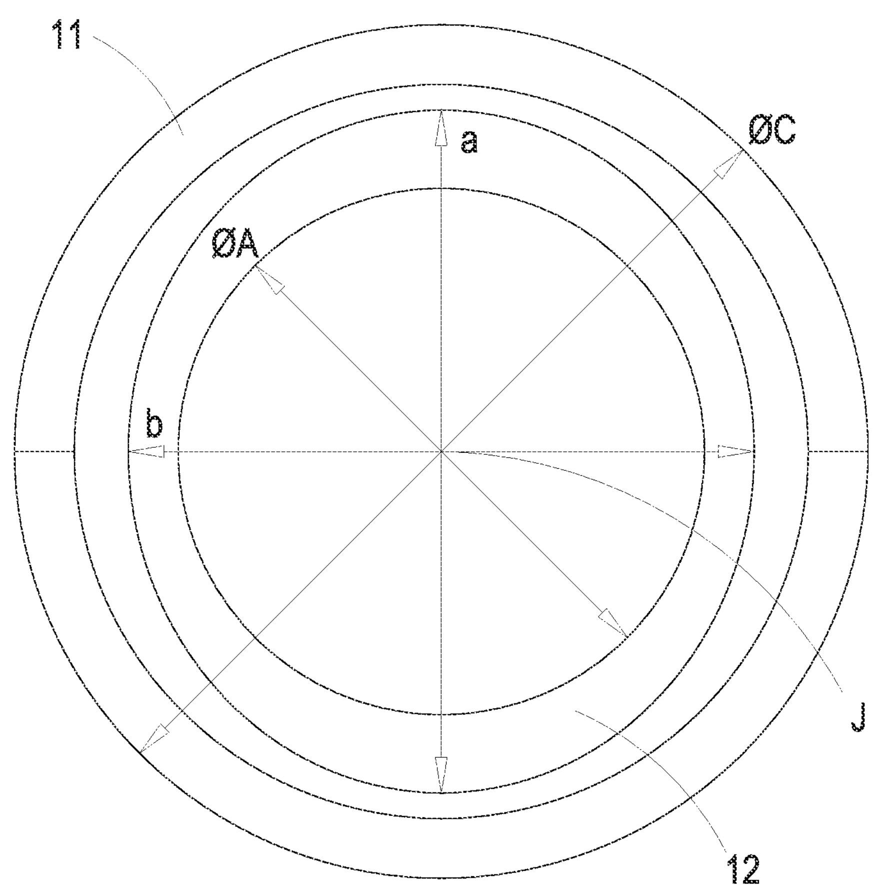
Figure 4:
FIG. 4 is a cross-section view illustrating the connection shaft of the speed-reducer-and-motor all-in-one machine according to the first embodiment of the present disclosure.
Figure 4:
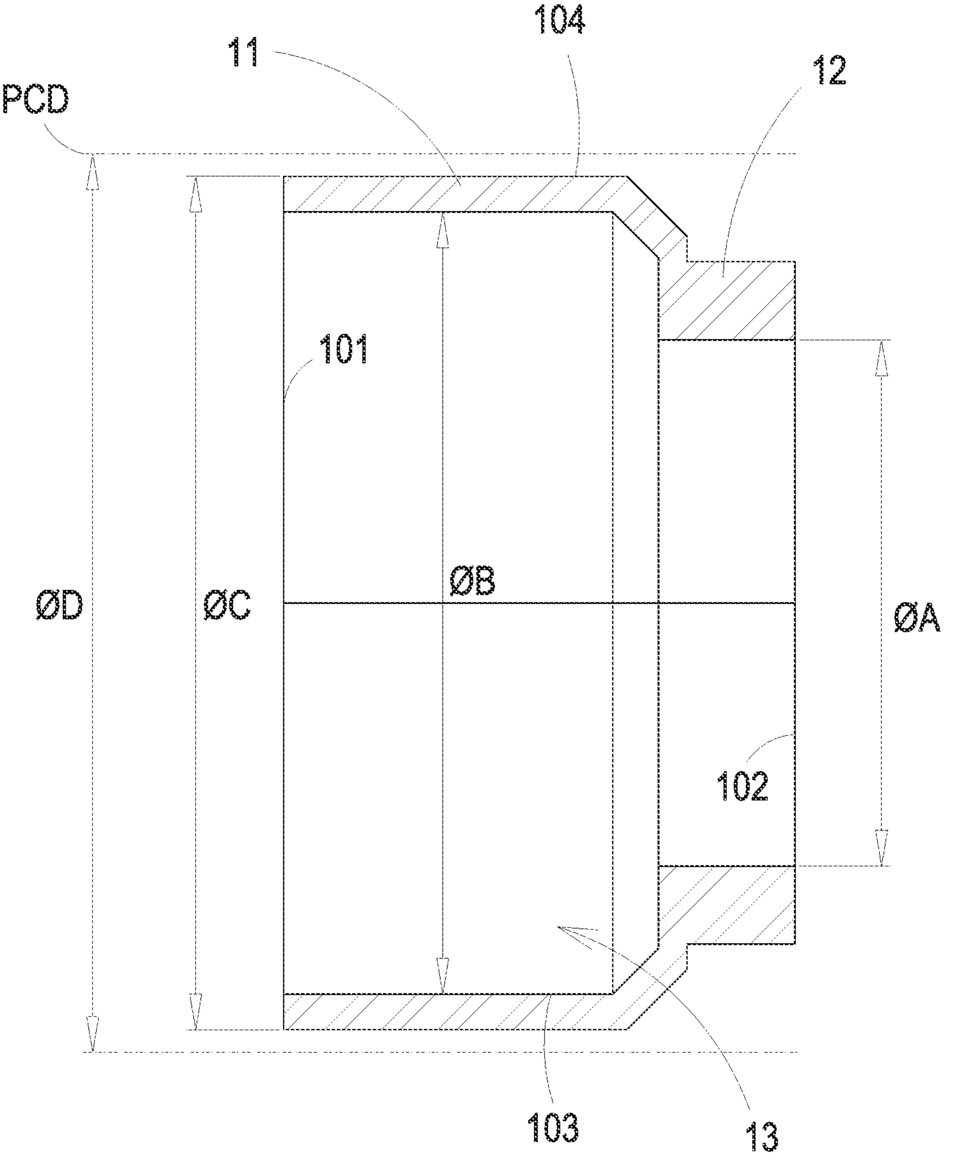

FIG. 1 is a cross-sectional view illustrating a speed-reducer-and-motor all-in-one machine according to a first embodiment of the present disclosure. FIG. 2 is a perspective structural view illustrating the connection shaft of the speed-reducer-and-motor all-in-one machine according to the first embodiment of the present disclosure. FIG. 3 is a rear view illustrating the connection shaft of the speed-reducer-and-motor all-in-one machine according to the first embodiment of the present disclosure. FIG. 4 is a cross-section view illustrating the connection shaft of the speed-reducer-and-motor all-in-one machine according to the first embodiment of the present disclosure. In the embodiment, the speed-reducer-and-motor all-in-one machine (hereinafter referred to as the all-in-one machine) 1, includes a connection shaft 10, a motor 20 and a speed reducer 30. The motor 20 and the speed reducer 30 are connected to each other through the connection shaft 10, so as to collaboratively form an all-in-one machine 1. Preferably but not exclusively, in the embodiment, the connection shaft 10 is integrally formed of a metal material into one piece, and includes a first section 11 and a second section 12 having different diameters and arranged in an axial direction J. Preferably but not exclusively, the axial direction J is parallel to the X axis, and perpendicular to the Y axis and the Z axis. The first section 11 of the connection shaft 10 has an outer periphery and an inner periphery in the shape of perfect circles. The second section 12 of the connection shaft 10 has an inner periphery in the shape of a perfect circle. In the embodiment, the outer diameter DC of the first section 11 is greater than the inner diameter (DA of the second section 12. Moreover, the outer diameter DC of the first section 11 is gradually increased to a constant value along a direction away from the second section 12. The connection shaft further includes an accommodation space 13, and the accommodation space 13 is in communication between the front end 101 and the rear end 102 of the connection shaft 10. An outer surface of the second section 12 of the connection shaft 10 forms an elliptical cam with a major axis length a and a minor axis length b. Preferably but not exclusively, in the embodiment, the motor 20 is an outer-rotor-and-inner-stator type, and includes a stator 21, a rotating element 22 and a central shaft 23. The stator 21 is fixed on the periphery of the central shaft 23. The central shaft 23 passes through the stator 21 and is arranged along the axial direction J. Preferably but not exclusively, the rotating element 22 is a magnet, spatially corresponding to the stator 21, and disposed around the outer periphery of the stator 21. When the motor 20 works, the stator 21 drives the rotating element 22 to rotate around the central shaft 23. In the embodiment, an inner surface of the first section 11 of the connection shaft 10 is concentrically sleeved on the rotating element 22 of the motor 20, so as to form a rotor of the motor 20. The central shaft 23 and the stator 21 are received in the accommodation space 13. In the embodiment, the speed reducer 30 is concentrically sleeved on the connection shaft 10 in the radial direction and connected to the motor 20 through the connection shaft 10. The speed reducer 30 includes a speed-reducer output 31, which is connected to the outer surface of the second section 12 of the connection shaft 10 through a first bearing 41. Thereby, the motor 20 and the speed reducer 30 are combined through the connection shaft 10 to form an integrated driving device. Compared with the conventional motor-and-speed-reducer device connected and arranged in the axial direction, the all-in-one machine 1 of the present disclosure further saves the number of components, and simplifies the assembling structure of the motor 20 and the speed reducer 30, so as to achieve the purposes of thinning and maintaining the performance of high reduction ratio at the same time.

In the embodiment, the first section 11 and the second section 12 of the connection shaft 10 are integrally formed into one piece, which can be regarded as a single component of the all-in-one machine 1 in structure. Since the connection shaft 10 is connected between the motor 20 and the speed reducer 30, multiple transmission functions are integrated on the single component. In the embodiment, the connection shaft 10 is connected to the motor 20 and configured to form a motor output shaft, which is connected to the rotating element 22 of the motor 20 through the inner surface of the first section 11 of the connection shaft 10. Since the connection shaft 10 is an integrated single component, when the stator 21 of the motor 20 drives the rotating element 22 to rotate, the connection shaft 10 and the rotating element 22 of the motor 20 are rotated synchronously, and can be served as the motor output shaft for further externally transmitting the kinetic energy generated by the motor 20. For example, it allows driving the speed reducer 30 through the connection shaft 10.

On the other hand, in the embodiment, the connection shaft 10 is connected to the speed reducer 30 and configured to form a reducer input shaft, which is connected to the reducer output shaft 31 of the speed reducer through the outer surface of the second section 12 of the connection shaft and a first bearing 41. When the momentum of the motor 20 is transmitted through the connection shaft 10 and the connection shaft 10 is driven to rotate, the connection shaft 10 can be served as the reducer input shaft. Cooperating with the internal gear assembly of the reducer 30, the momentum is transmitted into the reducer 30 through the connection shaft Namely, the rotating speed can be adjusted by the speed reducer 30 and then the momentum is outputted through the reducer output shaft 31.

In the embodiment, the outer surface of the second section 12 of the connection shaft 10 forms an elliptical cam with a major axis length a and a minor axis length b for providing the function as the reducer input shaft. Preferably but not exclusively, the minor axis length b is greater than an inner diameter ΦA of the second section 12 (i.e., b>ΦA), so as to prevent the minor axis of the elliptical cam from being tangent to the inner diameter ΦA of the second section 12. Moreover, in the embodiment, the minor axis length b is not greater than an outer diameter ΦC of the first section 11. Namely, b≤ΦC. The outer diameter ΦC of the first section 11 is spatially corresponding to the accommodation space 13 for receiving the motor 20. When the outer diameter ΦC of the first section 11 is increased, the accommodation space 13 of the connection shaft 10 for correspondingly receiving the motor 20 is increased.

In the embodiment, gear meshing in the speed reducer 30 has a pitch circle diameter (PCD) ΦD, which is related to the internal gear parameters of the speed reducer 30. Since the speed reducer 30 is disposed on the outer surface of the connection shaft 10 and the motor 20 is located on the inner surface of the first section 11 of the connection shaft 10, the pitch circle diameter (PCD) ΦD is not smaller than the outer diameter ΦC of the first section 11. Namely, ΦC≤ΦD.

Furthermore, in the embodiment, a design parameter X is defined by the pitch circle diameter (PCD) ΦD relative to the difference between the major axis length a and the minor axis length b. Namely, the design parameter X=the pitch circle diameter (PCD) ΦD/(the major axis length a−the minor axis length b). After testing, it is found that the motor 20 and the reducer 30 integrated in the all-in-one machine 1 of the present disclosure can obtain a better reduction ratio when the design parameter X is ranged from 18 to 92. In other words, in addition to realizing the thinning of the all-in-one machine 1 by disposing the motor 20 and the reducer 30 concentrically in the radial direction through the connection shaft 10, the all-in-one machine 1 of the present disclosure also controls the range of the design parameter X. That is, with 18≤X≤92, it allows the arrangement of the motor 20 and the speed reducer 30 of the present disclosure to maintain the performance of high reduction ratio.

Preferably but not exclusively, in the embodiment, the motor 20 is an outer-rotor-and-inner-stator type. Corresponding to the outer surface of the second section 12 of the connecting shaft 10 connected to the speed reducer 30 through the first bearing 41, the inner surface of the second section 12 of the connection shaft 10 is concentrically sleeved on the central shaft 23 of the motor through a second bearing 42 in the radial direction. In the embodiment, the reducer output shaft 31, the first bearing 41, the second section 12 of the connection shaft 10, the second bearing 42 and the central shaft 23 of the motor 20 are arranged radially from the outside to the inside. Thus, a coaxial structure is formed, and it is helpful of optimizing the space, shortening the length of the axial direction J, and meeting the requirements of thinning at the same time.

In the embodiment, the central shaft 23 of the motor 20 is extended outwardly through the front end 101 of the connection shaft 10, and the motor 20 includes a circuit board 24 fixed on an outer periphery of the central shaft 23, received in the accommodation space 13 and disposed adjacent to the front end 101 of the connection shaft 10. In the embodiment, the circuit board 24 is externally connected through a motor outlet 25, and the motor outlet 25 is externally connected through a hollow portion of the central shaft 23. In the embodiment, the motor 20 further includes an encoder 26, which is spatially corresponding to the front end 101 of the connection shaft 10, configured to measure a rotational speed and an angle information of the connection shaft 10. Preferably but not exclusively, the encoder 26 is fixed on an end cover 40 or the front end 101 of the connection shaft 10.

Moreover, in the embodiment, the all-on-one machine 1 includes an end cover 40 disposed adjacent to the front end 101 of the connection shaft 10 and fixed to an end of the central shaft 23 of the motor 20. In the embodiment, the front end 101 of the connection shaft 10 is connected to the end cover 40 through a third bearing 43. Preferably but not exclusively, the third bearing 43 is a particular depth gauge bearing. In the embodiment, the speed reducer 30 is connected to the end cover 40 through a fixed end 32. In the embodiment, the fixed end 32 of the speed reducer 30, the first section 11 of the connection shaft 10, and the rotating element 22, the stator 21 and the central shaft 23 of the motor 20 are arranged radially from the outside to the inside. Thus, a coaxial structure is formed, and it is helpful of optimizing the space, shortening the length of the axial direction J, and meeting the requirements of thinning at the same time.

Preferably but not exclusively, in the embodiment, the rotating element 22 is a magnet, arranged around the inner surface of the first section 11. The manner of fixing the rotating element 22 on the inner surface of the first section 11 is not limited in the present disclosure. Preferably but not exclusively, in an embodiment, the rotating element 22 is formed by a ring magnet, and directly attached to the inner surface of the first section 11. Preferably but not exclusively, in one embodiment, the rotating element 22 includes a plurality of magnets arranged equidistantly around. In other embodiments, the number, the size and the type of the rotating element 22, and the manner of fixing the rotating element 22 on the inner surface of the first section 11 are adjustable according to the practical requirements. The present disclosure is not limited thereto and not redundantly described herein.

Notably, in the embodiment, the accommodation space 13 formed by an inner peripheral wall 103 of the connection shaft 10 is configured to accommodate the stator 21, the rotating element 22, the central shaft 23 and the circuit board 24 of the motor 20. In the embodiment, an oil storage space 33 is formed between the reducer 30 and an outer peripheral wall 104 of the connection shaft 10 (including the first section 11 and the second section 12). Preferably but not exclusively, the oil storage space 33 can be served as a lubricating oil channel. Since the oil storage space 33 is located outside the integrated connection shaft 10, it belongs to a different independent space from the accommodation space 13 accommodating the motor 20 inside the connection shaft 10. In this way, the stator 21, the rotating element 22, the central shaft 23 and the circuit board 24 of the motor 20 received in the accommodation space 13 will not be polluted by the lubricating oil of the reducer 30. In other embodiments, the range of the oil storage space 33 and the manner of isolating the accommodation space 13 are adjustable according to the practical requirements. The present disclosure is not limited thereto and not redundantly described herein.

Figure 5:
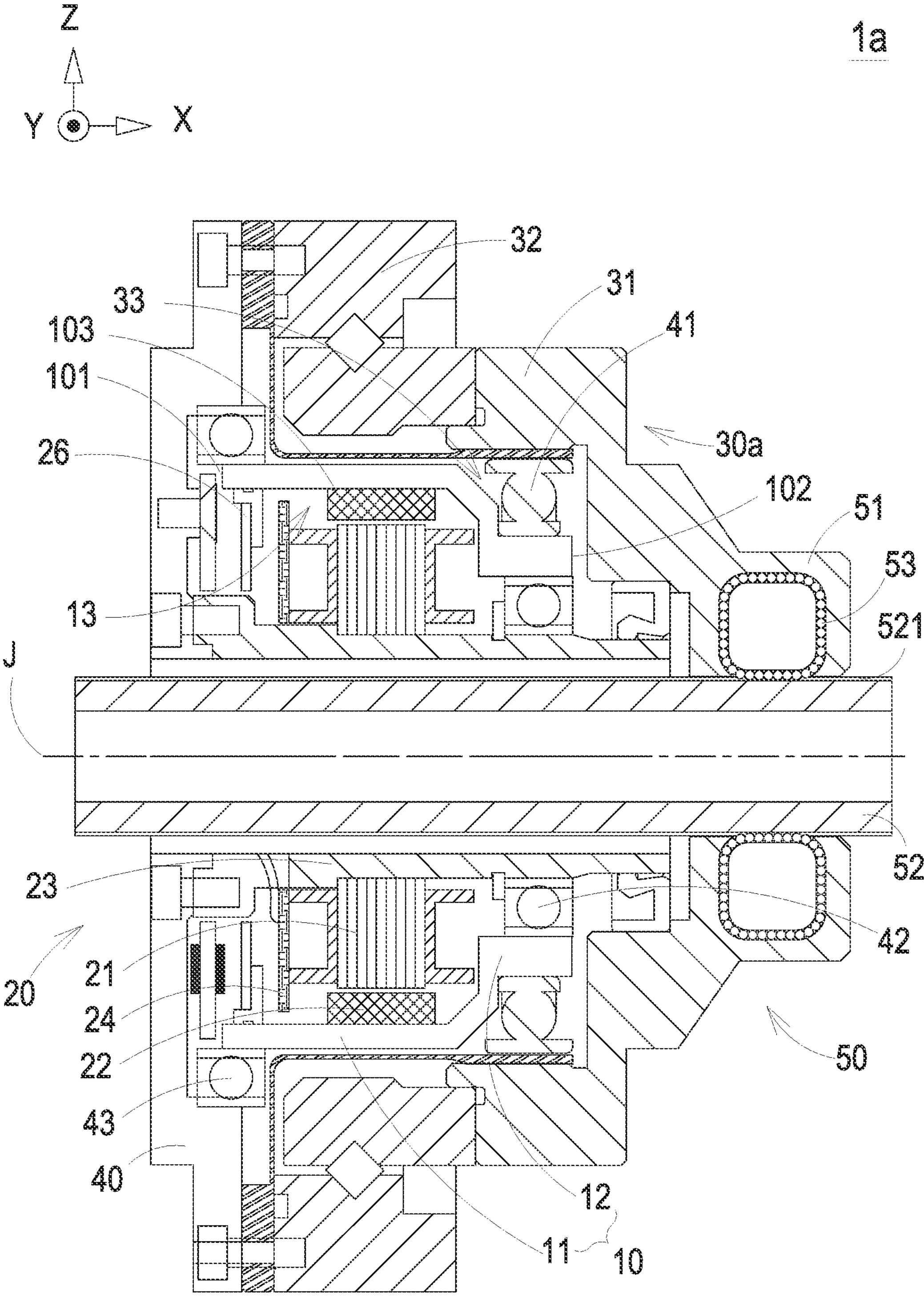
FIG. 5 is a cross-sectional view illustrating a speed-reducer-and-motor all-in-one machine according to a second embodiment of the present disclosure.

FIG. 5 is a cross-sectional view illustrating a speed-reducer-and-motor all-in-one machine according to a second embodiment of the present disclosure. In the embodiment, the structures, elements and functions of the peed-reducer-and-motor all-in-one machine la are similar to those of the peed-reducer-and-motor all-in-one machine 1 of FIG. 1 to FIG. 4, and are not redundantly described herein. In the embodiment, the peed-reducer-and-motor all-in-one machine 1 a further includes a ball spline 50 connected to the speed-reducer output shaft 31 of the speed reducer 30*a*. Preferably but not exclusively, the ball spline 50 includes a spline nut 51, a spline shaft 52 and a plurality of balls 53. The spline shaft 52 passes through the central shaft 23 of the motor 20 in the axial direction J, and includes a plurality of guiding grooves 521 extended along the axial direction J. The plurality of guiding grooves 521 are spatially corresponding to the plurality of balls 53 for partially receiving the plurality of balls 53. In addition, the spline nut 51 is concentrically sleeved on the spline shaft 52 in a radial direction, fixed on the speed-reducer output shaft 31, and connected with the spline shaft 52 through the plurality of balls 53. Preferably but not exclusively, in the embodiment, the plurality of balls 53 are contained in the spline nut 51 as the transmission medium between the spline nut 51 and the spline shaft 52. The arrangement of the plurality of balls 53 disposed between the spline nut 51 and the spline shaft 52 is not limited thereto. In the embodiment, the spline nut 51 is integrally formed with the speed-reducer output shaft 31 into one piece. In other embodiments, the fixation and the connection of the spline nut 51 and the speed-reducer output shaft 31 are achieved by fastening components, such as screws. The present disclosure is not limited thereto. Notably, with the connection of the speed-reducer output shaft 31 and the spline nut 51, it allows to connect the peed-reducer-and-motor all-on-one machine to the ball spline 50 directly and rotate along the axial direction, so as to provide the applications with the high reduction ratio and obtain a higher transmission torque with better cost advantages. Preferably but not exclusively, the spline shaft 52 of the ball spline 50 passes through the central shaft 23 of the motor 20, and the spline nut 51 is fixed and connected to the speed-reducer output shaft directly or integrated into one piece, so to make the overall structure more simplified and compact, improved the utilization rate of space volume, achieve the purpose of high reduction ratio, and obtain the higher transmission torque at the same time. Certainly, the present disclosure is not limited thereto. In other embodiments, the speed-reducer output shaft 31 of the speed reducer 30*a* is further connected to other ball splines or ball screws. Preferably but not exclusively, in an embodiment, the ball spline 50 is replaced by a rotary ball screw. Compared with the conventional ball spline or the conventional ball screw driven by the belt pulley, the all-in-one machine la of the present disclosure further combines the ball splines 50 or the rotary ball screw therewith. It facilitates to achieve the high reduction ratio, maintain the transmission rigidity, increase the rotational torque, and improve the space volume utilization effectively.

In summary, the present disclosure provides a speed-reducer-and-motor all-on-one machine. By integrating the configuration of the motor and the reducer, the problem that the conventional coaxial motor and reducer is difficult to reduce the entire volume and achieve thinning is improved, and the performance of high reduction ratio is maintained at the same. The speed reducer and the motor are combined through an integrated connection shaft. The connection shaft includes a first section and a second section arranged along an axial direction with different diameters to form different accommodation spaces. The outer-rotor motor and the speed reducer are cooperated with the connection shaft and sleeved concentrically in the radial direction to form parallel shafts, and the connection shaft is disposed between the outer rotor motor and the input shaft of the speed reducer. It is helpful for space optimization. In addition, the integrally formed connection shaft provides the same function as the output shaft of the outer-rotor motor and the input shaft of the speed reducer. Preferably, the first section with the larger diameter forms is configured to form the output shaft of the outer-rotor motor, and the second section with the smaller diameter is configured to form the input shaft of the speed reducer. It helps to simplify the connection of the output shaft of the outer-rotor motor to the input shaft of the speed reducer. There are two bearings concentrically sleeved through the second section of the connection shaft in the radial direction, and it is more conducive to shortening the axial length and achieving the thinning requirement. Furthermore, the first section that provides the function of the output shaft of the outer-rotor motor is a perfect circle, and it allows designing the outer diameter of the first section in accordance with the accommodation space required by the motor and the pitch circle diameter (PCD) of gear meshing in the speed reducer. The second section that provides the function of the input shaft of the speed reducer is an elliptical cam. Under the condition that the length of the minor axis of the elliptical cam is not tangent to the inner diameter of the second section and not greater than the outer diameter of the first section, the pitch circle diameter of the gear meshing in the speed reducer is further related to form a design parameter relative to the difference of the major axis length and the minor axis length of the elliptical cam. Within a specific range, it allows the motor and the speed reducer combined through the integrated connection shaft of the present disclosure to maintain the performance of high reduction ratio. Since independent spaces are provided in the interior and the exterior of the integrated connection shaft, the space formed between the reducer and the outer peripheral wall of the connection shaft can be served as an oil storage space, and the interior of the connection shaft can be served as an independent accommodation space for receiving the motor and the encoder. The independent accommodation space is not contaminated due to the lubricating oil of the reducer. On the other hand, it allows to connect the peed-reducer-and-motor all-on-one machine to a ball spline in the axial direction directly, so as to provide the applications with the high reduction ratio and obtain a higher transmission torque with better cost advantages. Preferably, the spline shaft of the ball spline passes through the central shaft of the motor, and the spline nut is fixed and connected to the speed-reducer output shaft directly, so as to form an integrated structure. It facilitates to make the overall structure more simplified and compact. Moreover, the utilization rate of space volume is improved effectively, the purpose of high reduction ratio is achieved, and the higher transmission torque is obtained at the same time.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed-reducer-and-motor all-on-one machine comprising:

a connection shaft comprising a first section, a second section and an accommodation space, wherein the first section and the second section are arranged in an axial direction, the accommodation space is in communication between a front end and a rear end of the connection shaft, an elliptical cam is formed on an outer surface of the second section of the connection shaft, and an outer diameter of the first section is greater than a major axis length of the elliptical cam, wherein the major axis length is measured along a major axis direction, from one point on an outer peripheral surface of the elliptical cam to an opposite point on the outer peripheral surface of the elliptical cam;

a motor received within the accommodation space and connected to an inner surface of the first section, wherein the motor comprises an encoder fixed on the front end of the connection shaft and the inner surface of the first section of the connection shaft, and the encoder is configured to measure a rotational speed and an angle information of the connection shaft; and a speed reducer connected to the outer surface of the second section.

2. The speed-reducer-and-motor all-on-one machine according to claim 1, wherein the motor comprises a stator, a rotating element and a central shaft, the central shaft passes through the stator and is arranged along the axial direction, and the rotating element is spatially corresponding to the stator, wherein the inner surface of the first section of the connection shaft is concentrically sleeved on the rotating element of the motor, so as to collaboratively form a rotor of the motor, wherein the central shaft and the stator are received in the accommodation space.

3. The speed-reducer-and-motor all-on-one machine according to claim 2, wherein the speed reducer is concentrically sleeved on the connection shaft and comprises a speed-reducer output shaft, and the speed-reducer output shaft is connected to the outer surface of the second section of the connection shaft through a first bearing.

4. The speed-reducer-and-motor all-on-one machine according to claim 3, wherein an inner surface of the second section of the connection shaft is concentrically sleeved on the central shaft of the motor through a second bearing in the radial direction.

5. The speed-reducer-and-motor all-on-one machine according to claim 4, wherein the speed-reducer output shaft, the first bearing, the second section of the connection shaft, the second bearing and the central shaft of the motor are arranged radially from the outside to the inside.

6. The speed-reducer-and-motor all-on-one machine according to claim 2, further comprising an end cover disposed adjacent to the front end of the connection shaft and fixed to an end of the central shaft of the motor.

7. The speed-reducer-and-motor all-on-one machine according to claim 6, wherein the encoder is further fixed on the end cover.

8. The speed-reducer-and-motor all-on-one machine according to claim 6, wherein the front end of the connection shaft is connected to the end cover through a third bearing.

9. The speed-reducer-and-motor all-on-one machine according to claim 1, wherein the outer diameter of the first section is gradually increased to a constant value along a direction away from the second section.

10. The speed-reducer-and-motor all-on-one machine according to claim 6, wherein the speed reducer comprises a fixed end connected to the end cover, the fixed end of the speed reducer, the first section of the connection shaft, and the rotating element, the stator and the central shaft of the motor are arranged radially from the outside to the inside.

11. The speed-reducer-and-motor all-on-one machine according to claim 2, wherein the central shaft of the motor is extended outwardly through the front end of the connection shaft, and the motor includes a circuit board fixed on an outer periphery of the central shaft, received in the accommodation space and disposed adjacent to the front end of the connection shaft.

12. The speed-reducer-and-motor all-on-one machine according to claim 11, wherein the circuit board is externally connected through a motor outlet, and the motor outlet is externally connected through a hollow portion of the central shaft.

13. The speed-reducer-and-motor all-on-one machine according to claim 1, wherein the elliptical cam has the major axis length and a minor axis length, wherein the minor axis length is greater than an inner diameter of the second section, and the minor axis length is not greater than an outer diameter of the first section, wherein the minor axis length is measured along a minor axis direction, from one point on the outer peripheral surface of the elliptical cam to an opposite point on the outer peripheral surface of the elliptical cam.

14. The speed-reducer-and-motor all-on-one machine according to claim 13, wherein gear meshing in the speed reducer has a pitch circle diameter, and the pitch circle diameter is not smaller than the outer diameter of the first section.

15. The speed-reducer-and-motor all-on-one machine according to claim 14, wherein a design parameter is defined by the pitch circle diameter relative to the difference between the major axis length and the minor axis length, and the design parameter is ranged from 18 to 92.

16. The speed-reducer-and-motor all-on-one machine according to claim 1, wherein the first section and the second section of the connection shaft are integrally formed into one piece.

17. The speed-reducer-and-motor all-on-one machine according to claim 1, wherein the connection shaft is configured to form a motor output shaft, and connected to the rotating element of the motor through the inner surface of the first section of the connection shaft, wherein when the motor is rotated, the speed reducer is driven through the connection shaft.

18. The speed-reducer-and-motor all-on-one machine according to claim 1, wherein the connection shaft is configured to form a reducer input shaft and connected to a speed-reducer output shaft through the outer surface of the second section of the connection shaft and the first bearing, wherein when the motor is rotated, the speed reducer is driven through the connection shaft.

19. The speed-reducer-and-motor all-on-one machine according to claim 1, further comprising a ball spline connected to the speed-reducer output shaft, wherein the ball spline includes a spline nut, a spline shaft and a plurality of balls, the spline shaft passes through the central shaft of the motor in the axial direction, and the spline nut is concentrically sleeved on the spline shaft in a radial direction, fixed on the speed-reducer output shaft, and connected with the spline shaft through the plurality of balls.

20. The speed-reducer-and-motor all-on-one machine according to claim 1, wherein an oil storage space is formed between the reducer and an outer peripheral wall of the connection shaft.

* * * * *